United States Patent [19]

Kobayashi et al.

[11] Patent Number: 5,108,253
[45] Date of Patent: Apr. 28, 1992

[54] HYDRAULIC PIPING STRUCTURE FOR A BACKHOE

[75] Inventors: Masahiko Kobayashi; Takafumi Wada; Siro Sugiyama, all of Osaka, Japan

[73] Assignee: Kubota, Ltd., Osaka, Japan

[21] Appl. No.: 481,458

[22] Filed: Feb. 16, 1990

[30] Foreign Application Priority Data

Feb. 16, 1989 [JP] Japan .................. 1-17633[U]
Feb. 17, 1989 [JP] Japan .................. 1-18333[U]

[51] Int. Cl.$^5$ ............................................. F02F 3/36
[52] U.S. Cl. .................................... 414/694; 414/918
[58] Field of Search ............. 414/694, 695, 695.15, 414/695.6, 695.7, 669.8, DIG. 918

[56] References Cited

U.S. PATENT DOCUMENTS

| | | | |
|---|---|---|---|
| 3,120,897 | 2/1964 | Van Auwelaer . | |
| 4,156,487 | 5/1979 | David et al. | 414/694 |
| 4,304,077 | 12/1981 | Muller | 52/115 |
| 4,775,286 | 10/1988 | Gillette et al. | 414/687 |
| 4,836,740 | 6/1989 | Wagner | 414/918 |

FOREIGN PATENT DOCUMENTS

| | | |
|---|---|---|
| 0273299 | 7/1988 | European Pat. Off. . |
| 2230897 | 12/1972 | Fed. Rep. of Germany . |
| 2323085 | 4/1977 | France . |
| 61-80852 | 5/1986 | Japan . |
| 63-76050 | 5/1988 | Japan . |
| 64-10568 | 1/1989 | Japan . |

*Primary Examiner*—Jesús Sotelo
*Attorney, Agent, or Firm*—Gifford, Groh, Sprinkle, Patmore and Anderson

[57] ABSTRACT

A hydraulic piping structure for controlling a boom assembly supported through a swing bracket by a swivel deck of a backhoe. The piping structure includes a plurality of hydraulic hoses for supplying oil from a pressure source mounted on the swivel deck to hydraulic cylinders for controlling a boom and other components of the boom assembly. These hoses are arranged parallel on an upper face of the boom, with hoses connected to a boom cylinder being curved on a vertical plane. The parallel boses extend to the swivel deck through an interior space of the swing bracket and are fixed in position by a clamp mechanism therein. On the swivel deck, these hoses are separated into two batches and fixed in position by further clamp mechanisms, respectively.

6 Claims, 6 Drawing Sheets

HYDRAULIC PIPING STRUCTURE FOR A BACKHOE

TECHNICAL FIELD

The present invention relates to a hydraulic piping structure for a backhoe comprising a boom supported by a swivel deck through a swing bracket to be swingably on a vertical axis and pivotable on a horizontal axis by a boom cylinder, at least one control cylinder mounted on the boom for controlling a bucket and an arm, and a hydraulic pressure source mounted in a swivel deck region.

BACKGROUND OF THE INVENTION

Hydraulic piping structures for supplying pressure oil to cylinders for controlling the boom, arm and bucket of a backhoe are disclosed in Japanese Utility Model Publications Kokai Nos. 61-80852 and 63-76050. These piping structures include hydraulic hoses extending in an upwardly curved form from a joint disposed on a surface of a swivel deck at a position laterally displaced from a swing bracket, to a terminal mounted on an upper face of a proximal end portion of the boom. Hydraulic hoses for controlling the boom extend in the upwardly curved form from the boom cylinder to be directly connected to the terminal on the swivel deck.

In the known structures noted above, the joint mounted on the swivel deck is laterally displaced from the swing bracket, which requires the curved portions of the hydraulic hoses to have additional slack lengths to accommodate sideways swings of the boom as well. Compared with the case where the joint is disposed directly rearwardly of the swing bracket, the hydraulic hoses have longer and higher curved portions. Such hoses could obstruct the driver's field of view, making it difficult for the driver to carry out a required operation.

SUMMARY OF THE INVENTION

An object of the present invention is to improve the hydraulic piping structure for a backhoe of the type noted at the outset hereof, and to eliminate the disadvantage of the prior art.

A hydraulic piping structure according to the present invention may, for example, comprise a pressure oil relaying section disposed in a connection region between the boom and swing bracket, a first group of hydraulic hoses curved on a substantially vertical plane and interconnecting the boom cylinder and pressure oil relaying section, a pressure oil terminal disposed on an upper surface of the boom, fixed oil lines interconnecting the pressure oil relaying section and pressure oil terminal, a second group of hydraulic hoses interconnecting the pressure source and pressure oil terminal, and a third group of hydraulic hoses interconnecting the pressure source and control cylinder. The second and third groups of hydraulic hoses may extend to a main backhoe body through an interior space of the swing bracket.

To fulfill the above-mentioned object, according to the present invention, the second and third groups of hydraulic hoses are arranged side by side on the upper surface of the boom, and fixed in position inside the swing bracket by a clamp mechanism. Further, the second and third groups of hydraulic hoses are separated from each other in a region on the swivel deck between the swing bracket and pressure source, and fixed in position by separate clamp mechanisms.

With the above construction, the first group of hydraulic hoses for supplying oil to the boom cylinder includes curved portions having reduced lengths between the boom and boom cylinder. These hoses may be arranged on the upper surface of the boom together with the second group of hydraulic hoses that supplies oil to the arm cylinder and bucket cylinder. Thus, all of the hydraulic hoses extend parallel to one another through the interior space of the swing bracket to the swivel deck.

The hydraulic hoses are fixed in position inside the swing bracket. Thus, the hoses are prevented from making a frictional contact with the swing bracket due to pivotal movement of the boom.

The second and third groups of hoses are fixed in position on the swivel deck as laterally separated from each other. This arrangement allows the two groups of hoses to bend and become displaced without mutual interference, despite a difference therebetween in the rate of bending relative to sideways swinging movement of the boom.

Thus, the hydraulic hoses have reduced slack lengths adjacent the swing bracket for accommodating both vetical and sideways oscillations of the boom. As a result, the slack lengths as a whole are reduced as compared with those in the prior at, which substantially reduces the bending height of the hydraulic hoses above the swing bracket to minimize the possibility of obstructing the driver's field of view during an operation.

The curved portions of the hoses connected to the boom cylinder which now have reduced lengths do not obstruct the driver's field of view either.

In the prior art, the hydraulic hoses have been curved upwardly over extensive lengths adjacent the swing bracket, and that in an oblique way. Thus, there has been room for improvement in outward appearance too. According to the present invention, outward appearance is also improved since the hydraulic hoses are arranged parallel to one another and extend directly rearwardly of the boom in an orderly way with a small upward curve and with only minor portions thereof exposed outwardly of the vehicle.

Normally, the boom cylinder is more powerful and requires thicker hydraulic hoses than the arm cylinder and bucket cylinder. As a result, horizontal swings of the boom cause the second and third groups of hoses to bend to different degrees on the swivel deck.

However, since these groups of hoses are fixed separately from each other, the hoses are free from the damage due to mutual interference.

In a preferred embodiment of the invention, the second and third groups of hydraulic hoses are curved on a substantially horizontal plane on the swivel deck to absorb movement of the hydraulic hoses due to horizontal pivoting movement of the boom. The second and third groups of hydraulic hoses may be curved to bulge toward the side of a longitudinal centerline of the backhoe where the boom has a smaller maximum horizontal swing angle. This construction allows horizontal movement of the second and third groups of hoses to be absorbed in a rational way when the boom swings horizontally.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show a hydraulic piping structure for a backhoe according to the present invention, in which.

DESCRIPTION OF THE PREFERRED EMBODIMENT

An embodiment of the present invention will be described hereinafter with reference to the drawings.

Figure 1:
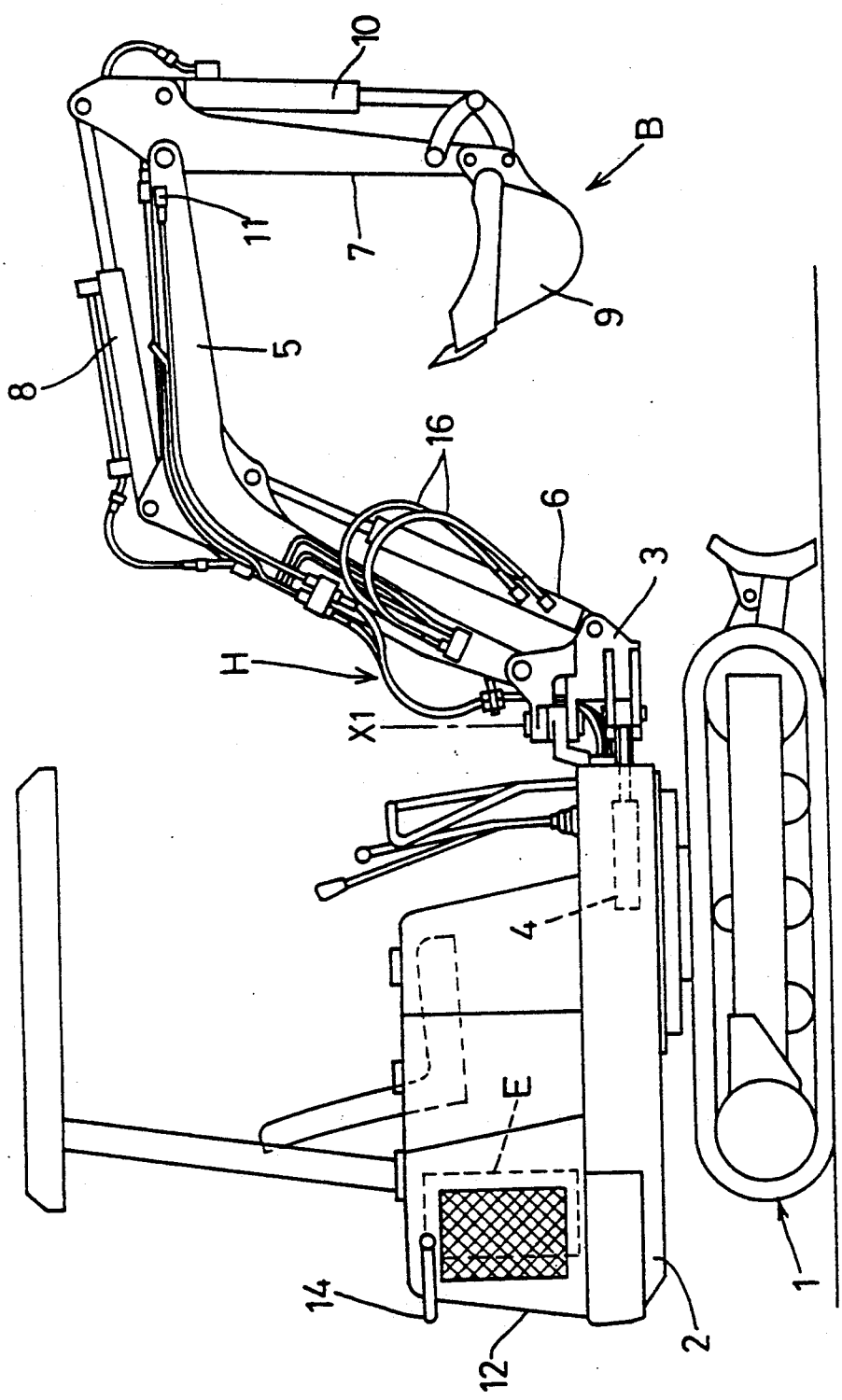
FIG. 1 is a side elevation of the backhoe.

Referring to FIG. 1, a backhoe vehicle comprises a crawler running device 1, and a swivel deck 2 mounted on the crawler running device 1. The swivel deck 2 carries a boom supporting swing bracket 3 swingable on a vertical axis X1 by a hydraulic cylinder 4. A boom 5 is attached to the swing bracket 3 to be vertically pivotable by a hydraulic cylinder 6. The boom 5 carries an arm 7 vertically pivotable by a hydraulic cylinder 8. The arm 7 carries a bucket 9 vertically pivotable by a hydraulic cylinder 10. The boom 5 includes a service port 11 at a distal end thereof to take out hydraulic power for driving a hydraulic implement such as a hand breaker (not shown).

Figure 2:
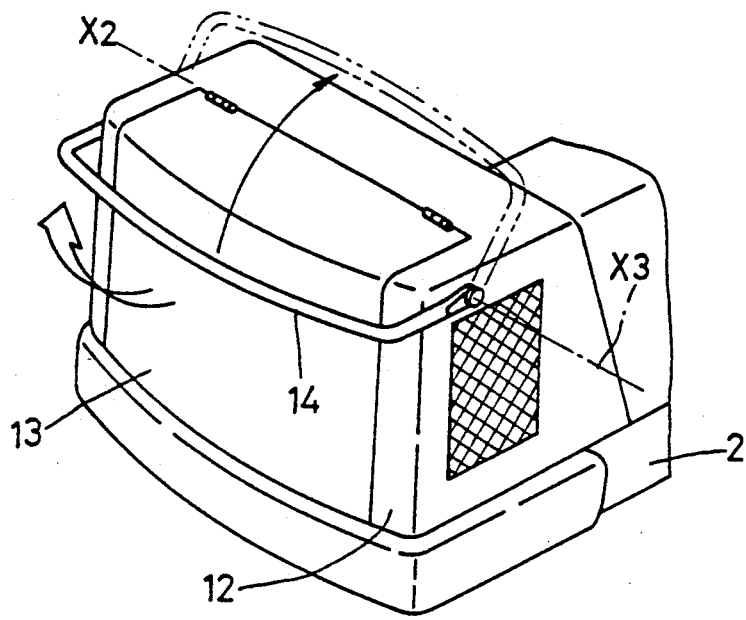
FIG. 2 is a rear perspective view of a hood.

The swivel deck 2 includes a hood 12 mounted on a rear position thereof and housing an engine E. As shown in FIG. 2, the hood 12 includes a hood cover 13 pivotable on a horizontal axis X2 between an open position and a closed position. The hood 12 further includes an approximately U-shaped protector 14 disposed at an upper rear position to be vertically pivotable on a horizontal axis X3 for protecting the cover 13. Thus the cover 13 may be opened after swinging the protector 14 upwardly.

Figure 3:
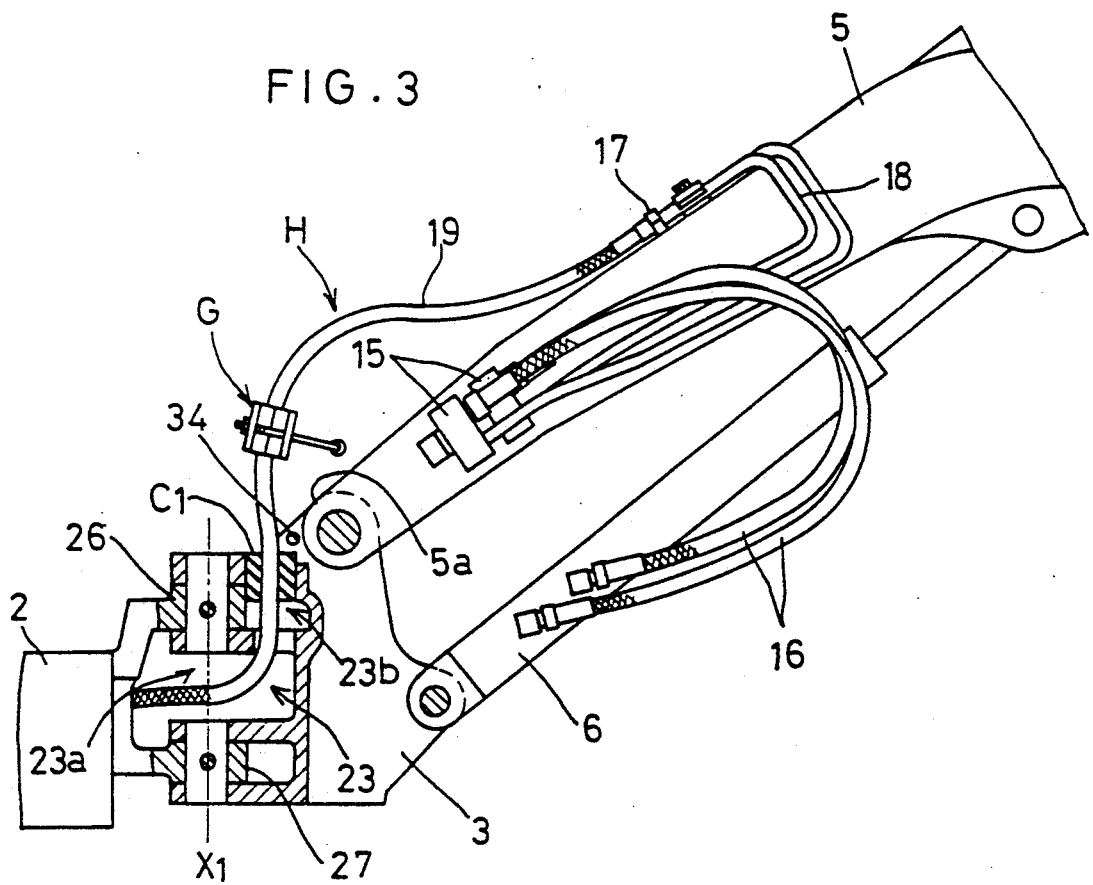
FIG. 3 is a side view, partly in section, of a principal portion of the piping structure.
Figure 4:
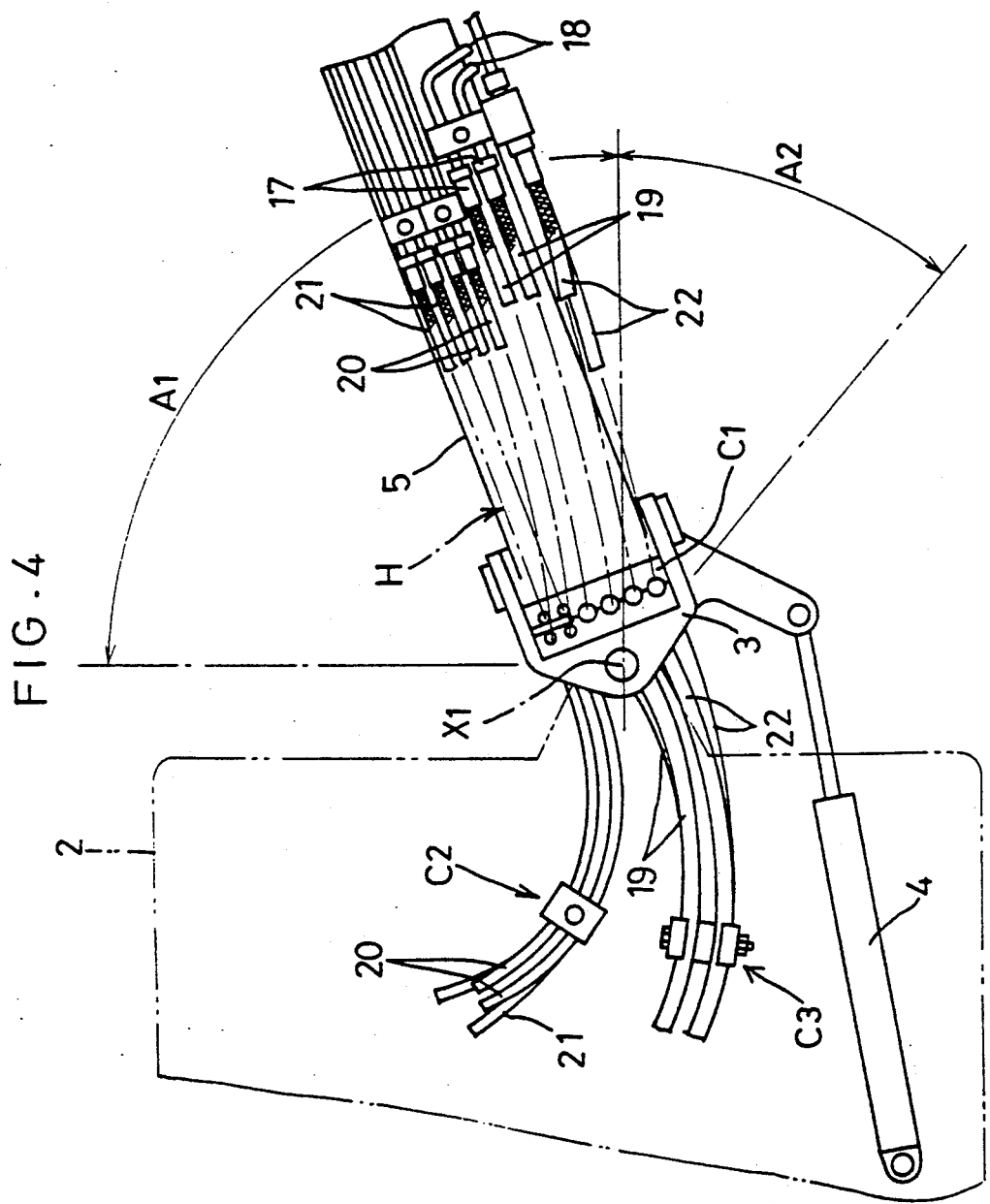
FIG. 4 is a plan view of the principal portion.
Figure 5:
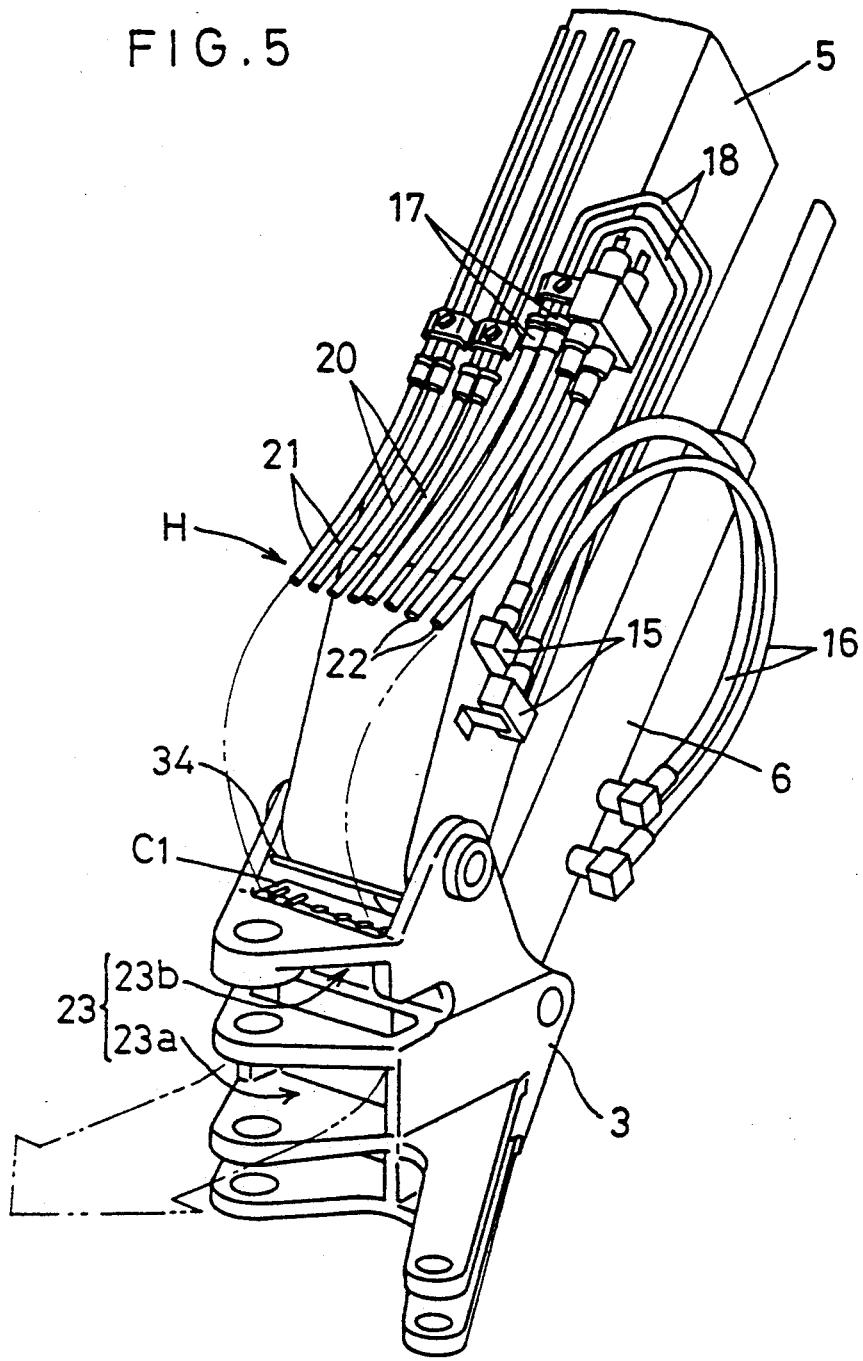
FIG. 5 is a perspective view of the principal portion.

The boom cylinder 6, arm cylinder 8 and bucket cylinder 10 are connected to the swivel deck 2 through hydraulic piping. As shown in FIGS. 3 through 5, this piping structure includes a first group of hydraulic hoses 16 curved along a plane of vertical pivotal movement of the boom 5 and connecting the boom cylinder 6 to pressure oil relays 15 disposed adjacent a position of the boom 5 connected to the swing bracket 3. The relays 15 are connected through fixed pipes 18 to pressure oil terminals 17 mounted on an upper surface of the boom 5. Further, a number of hydraulic hoses H are arranged parallel to one another on the upper surface of the boom 5. These hoses H include a second group of hydraulic hoses 19 connected to the terminals 17 for supplying oil to the boom cylinder 6, a third group of hydraulic hoses 20 and 21 respectively for supplying oil to the bucket cylinder 10 and arm cylinder 8, and a fourth group of hydraulic hoses 22 for supplying oil to the service port 11. The parallel hydraulic hoses H extend to the swivel deck 2 through an interior space 23 of the swing bracket 3. The swing bracket 3 includes a clamp mechanism C1 mounted therein for fixing the hydraulic hoses H in position inside the swing bracket 3. The hydraulic hoses H, as they extend from the bracket 3 to the swivel deck 2, are divided into two batches, one of which includes the third group of hydraulic hoses 20 and 21 that supplies oil to the bucket cylinder and arm cylinder, and the other includes the second group of hydraulic hoses 19 that supplies oil to the boom cylinder and the forth group of hydraulic hoses 22 that supplies oil to the service port. The two batches are laterally spaced apart from each other and fixed to the swivel deck 2 by clamp mechanisms C2 and C3, respectively.

As shown in FIG. 3, the swing bracket 3 is connected to the swivel deck 2 through two, upper and lower, pivotal connections 26 and 27. These connections 26 and 27 are aligned on the vertical axis X1 by separate pins (not shown) so as to define a space 23a therebetween. A sideways elongate rectangular communicating section 23b is formed between the upper connection 26 and a boom support portion 3a. The space 23a and communicating section 23b together define the interior space 23 of the swing bracket 3.

The hydraulic hoses H, as they extend from the terminals 17 to the bracket 3, are retained by a guard mechanism G to be parallel to one another at a position adjacent the upper surface of the boom 5.

Figure 6:
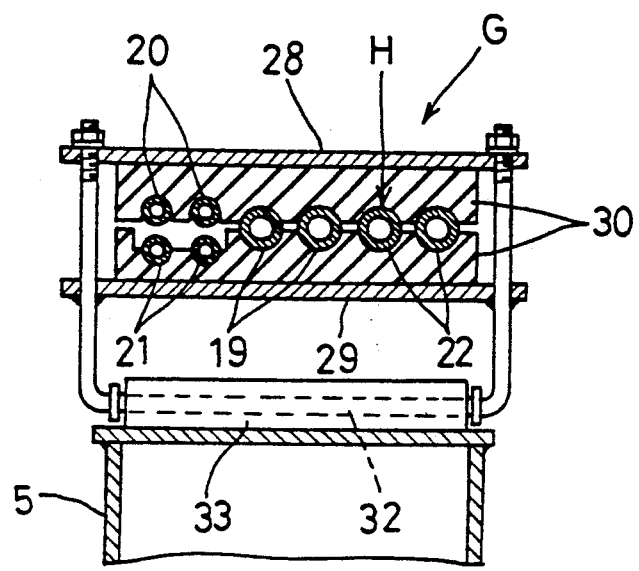
FIG. 6 is a rear view, partly in section, of a guard mechanism.

As shown in FIG. 6, the guard mechanism G includes an upper plate 28, a lower plate 29, and rubber cushions 30 mounted between the two plates 28 and 29 for holding the hydraulic hoses H parallel to one another. The two plates 28 and 29 are fixed tight together by bolts and nuts. A guard member 32, which is U-shaped in front view, carrying a roller 33 fitted thereon is secured to the lower plate 29. The roller 33 of the guard mechanism G contacts the upper surface of the boom 5 when the boom 5 pivots upward, thereby keeping the hydraulic hoses H out of contact with the boom 5. The roller 33 is rotatable to lessen contact resistance.

A round protective bar 34 extends transversely of the bracket 3 above the communicating section 23b, adjacent the boom support portion 3a and forwardly of the guard mechanism G. The protective bar 34 prevents the hydraulic hoses H from contacting a distal end 5a of the boom 5 when the boom 5 pivots downward.

Figure 7:
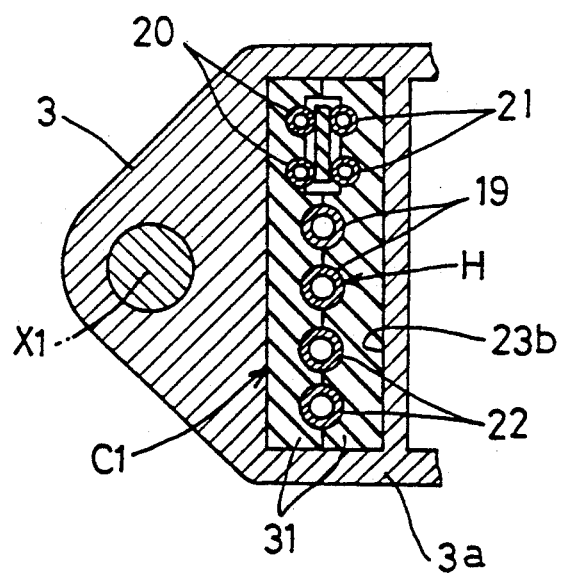
FIG. 7 is a plan view of a clamp mechanism mounted in a swing bracket.

Referring to FIG. 7, the hydraulic hoses H are fixed in position inside the communicating section 23b by the clamp mechanism C1 mounted in the interior space 23 of the bracket 3. The clamp mechanism C1 includes rubber cushions 31 holding the hydraulic hoses H therebetween and relative to the communicating section 23b. The hydraulic hoses H are arranged in the order, from right to left with respect to the forward traveling direction of the vehicle, of the hydraulic hoses 22, 19, 21 and 20 which supply oil to the service port 11, boom cylinder 6, arm cylinder 8 and bucket cylinder 10. The hydraulic hoses 20 and 21 have a small diameter and are in a two-step arrangement in the fore and aft direction.

As seen from FIG. 4, the third group of hoses 20 and 21 are arranged in a different curved state to the second and fourth groups of hoses 19 and 22. That is, the third group of hoses 20 and 21 has a smaller radius of curvature than the second and fourth groups of hoses 19 and 22. These hoses are curved to bulge toward the smaller swing angle side of the boom 5, namely rightward. As shown in FIG. 4, the boom 5 has a leftward swing angle A1 larger than a rightward swing angle A2 with respect to a longitudinal centerline of the backhoe vehicle. Consequently, the third group of hoses 20 and 21 is bent to a greater degree. This curving state is convenient since the hoses 20 and 21 of the third group have a smaller diameter than the hoses 19 and 22 of the second and fourth groups.

Figure 8:
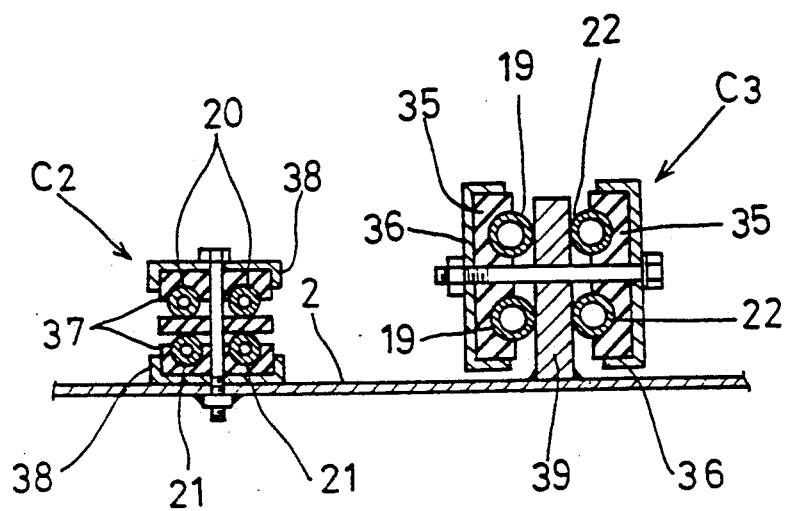
FIG. 8 is a rear view, partly in section, of clamp mechanisms mounted on a swivel deck.

Referring to FIG. 8, the clamp mechanism C3 includes rubber cushions 35 and retainer plates 36 opposed across a tongue 39 erected on the swivel deck 2. The second group of hoses 19 through which oil flows to and from the boom cylinder is arranged vertically on one side of the tongue 39, while the fourth group of hoses 22 through which oil flows to and from the service port is arranged vertically on the other side, the two groups being held tight by a bolt extending through the rubber cushions 35, retainer plates 36 and tongue 39.

The clamp mechanism C2 includes rubber cushions 37 and retainer plates 38 lying horizontally for holding the third group of hoses 20 and 21. The hoses 20 through which oil flows to and from the bucket cylinder are arranged horizontally over the hoses 21 also arranged horizontally through which oil flows to and from the arm cylinder. The third group of hoses 20 and 21 is held tight by a bolt extending through the rubber cushions 37 and retainer plates 38 to the swivel deck 2.

In the present invention, as described above, the hydraulic piping for the boom cylinder has a divided piping structure including the relaying hoses 16, relays 15 and fixed pipes 18. This allows the hydraulic piping for the boom cylinder to be arranged parallel to the hydraulic hoses 20, 21 and 22 at the pressure oil terminals 17. The hoses 16 may have a minimal length, thereby to present no obstruction to the driver's field of view.

What is claimed is:

1. A hydraulic piping structure for a backhoe having a swivel deck, a swing bracket attached to said swivel deck so as to be swingable on a vertical axis, a boom attached to said swing bracket and pivotable about a horizontal axis by a boom cylinder, an arm attached to said boom, a bucket attached to said arm, at least one hydraulic cylinder mounted on said boom for controlling said bucket and said arm, and a hydraulic pressure source mounted on said swivel deck for providing pressurized oil, said piping structure comprising;

means for relaying said pressurized oil from said hydraulic pressure source, said means for relaying being disposed on said boom adjacent to said swing bracket, a first group of hydraulic hoses curved on a substantially vertical plane and interconnecting said boom cylinder and said means for relaying pressurized oil, at least one pressure oil terminal disposed on an upper surface of said boom, fixed oil lines interconnecting said means for relaying pressurized oil to said at least one pressure oil terminal, a second group of hydraulic hoses interconnecting said hydraulic pressure source and said at least one pressure oil terminal, a third group of hydraulic hoses interconnecting said hydraulic pressure source and said at least one hydraulic cylinder, said swing bracket comprising upper and lower pivotal connections for fastening said swing bracket to said swivel deck about said vertical axis, said swing bracket having a boom support portion to which said boom is pivotably connected to pivot about said horizontal axis, said boom support portion of said swing bracket defining an interior space therein between said boom and said swivel body, a first clamp mechanism positioned within said interior space to fixedly secure said second and third groups of hydraulic hoses in close proximity to said vertical axis, said second and third groups of hydraulic hoses extending to said swivel deck through said interior space of said swing bracket, wherein said second and third groups of hydraulic hoses are arranged side by side on said upper surface of said boom, said second and third groups of hydraulic hoses are separated from each other in a region of said swivel deck between said swing bracket and said hydraulic pressure source, and fixed in position by separate clamp mechanisms.

2. The hydraulic piping structure of claim 1, wherein said second and third groups of hydraulic hoses are curved on a substantially horizontal plane on said swivel deck to absorb movement of said hydraulic hoses due to horizontal pivoting movement of said boom.

3. The hydraulic piping structure of claim 2, having second and third clamp mechanisms for securing said second and third groups of hydraulic hoses to said swivel deck laterally displaced from one another, said third group of hydraulic hoses having a smaller radius of curvature than said second group of hydraulic hoses, wherein said second and third groups of hydraulic hoses are curved to bulge toward a side of a longitudinal centerline of said backhoe where said boom has a smaller maximum horizontal swing angle.

4. The hydraulic piping structure of claim 1, having a protective bar attached to said swing bracket transverse to said boom at a point above and said first clamp mechanism, said protective bar preventing said second and third groups of hydraulic hoses from contacting said boom when said boom pivots downward.

5. The hydraulic piping structure of claim 1, having a guard mechanism attached to said second and third groups of hydraulic hoses for securing said second and third groups of hydraulic hoses above said boom and between said at least one pressure oil terminal and said swing bracket, said guard mechanism having a roller secured to guard mechanism on a side facing said boom, said roller contacting said upper surface of said boom.

6. The hydraulic piping structure of claim 5, having a fourth group of hydraulic hoses extending from hydraulic pressure, through said interior space of said swing brackets, through said first clamp mechanism and said guard mechanism to a service port disposed on said boom.

* * * * *